(12) United States Patent
Violleau et al.

(10) Patent No.: US 7,926,086 B1
(45) Date of Patent: Apr. 12, 2011

(54) ACCESS CONTROL MECHANISM FOR SHAREABLE INTERFACE COMMUNICATION ACCESS CONTROL

(75) Inventors: Thierry P. Violleau, Poissy (FR); Tanjore Ravishankar, San Jose, CA (US); Matthew R. Hill, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 976 days.

(21) Appl. No.: 11/591,084

(22) Filed: Oct. 31, 2006

(51) Int. Cl.
*H04L 29/00* (2006.01)

(52) U.S. Cl. .......................................... 726/1; 713/161

(58) Field of Classification Search .................. 726/1–3; 713/161, 168
See application file for complete search history.

(56) References Cited

U.S. PATENT DOCUMENTS

| | | | |
|---|---|---|---|
| 7,127,605 B1 * | 10/2006 | Montgomery et al. | ....... 713/150 |
| 7,194,764 B2 * | 3/2007 | Martherus et al. | ................ 726/8 |
| 2002/0174224 A1 | 11/2002 | Scheifler et al. | |
| 2003/0084325 A1 * | 5/2003 | Koved et al. | ................... 713/200 |
| 2004/0088562 A1 | 5/2004 | Vassilev et al. | |
| 2004/0216150 A1 | 10/2004 | Scheifler et al. | |

FOREIGN PATENT DOCUMENTS

| | | |
|---|---|---|
| EP | 1 431 862 A2 | 6/2004 |
| WO | WO 2005/045735 A1 | 5/2005 |

OTHER PUBLICATIONS

Gong, L. et al., "Implementing Protection Domains in the Java™ Development Kit 1.2", Proceedings of the Internet Society Symposium on Network and Distributed System Security, XP-002304112, Mar. 1988, 10 pages.

Gong, L. et al., "Going Beyond the Sandbox: An Overview of the New Security Architecture in the Java™ Development Kit 1.2", Proceedings of the Usenix Symposium on Internet Technologies and Systems, XP-002250254, Dec. 1997, 10 pages.
Gong, L. et al., "Java Security Architecture (JDK 1.2)", Internet Citation, XP-002171445, dated Dec. 6, 1998, 62 pages.
European Patent Office, "European Search Report", European application No. 07250044.0-2212, received Nov. 30, 2007, 10 pages.
Claims, European application No. 07250044.0-2212, 5 pages.
European Patent Office, "European Search Report", European application No. 06256576.7-2212, received Jan. 3, 2008, 11 pages.
Claims, European application No. 06256576.7-2212, 5 pages.

(Continued)

*Primary Examiner* — Brandon S Hoffman
*Assistant Examiner* — Anthony Brown
(74) *Attorney, Agent, or Firm* — Osha • Liang LLP (57) ABSTRACT

A access control mechanism is provided on a computing device to allow an application provider to set up a declarative security policy specific to an application module. When a runtime environment of the computing device receives a request from a second application instance in a second execution context to access a protected resource in a first application instance, the runtime environment invokes the access control mechanism to determine, based on a protection-domain-level domain security policy, whether the second application instance is allowed to access protected resources in the first execution context. If so, the runtime environment invokes the access control mechanism to determine, based on a declarative security policy for a first application module associated with the first application instance, whether the second application instance is allowed to access the protected resource. If so, the runtime environment allows the second application instance access to the protected resource requested.

7 Claims, 4 Drawing Sheets

OTHER PUBLICATIONS

Nagaratnam, Nataraj et al., "Practical delegation for secure distributed object environments", Distributed Systems Engineering, Institute of Physics Publishing, Bristol, Great Britain, vol. 5, No. 4, XP-020073372, Dec. 1, 1998, 12 pages.

Wangham, Michelles et al., "Security Mechanisms for Mobile Agent Platforms Based on SPKI/SDSI Chains of Trust", Software Engineering for Multi-Agent Systems II Lecture Notes in Computer Science, Springer-Verlag, Berlin, vol. 2940, XP-019003515, 2004, 18 pages.

Molva, Refik et al., "A Distributed Access Control Model for Java", Computer Security, Esorics 2000 Lecture, Notes in Computer Science, Springer-Verlag, 2000, Heidelberg, Berlin, XP-019049349, vol. 1895, 18 pages.

European Patent Office, "Communication pursuant to Article 94(3) EPC", Application No. 06256576.7-2212, dated Jul. 17, 2008, 4 pages.

Claims, Application No. 06256576.7-2212, 3 pages.

European Patent Office, "Communication pursuant to Article 94(3) EPC", Application No. 07250044-2212, dated Jul. 3, 2008, 1 page.

Claims, Application No. 07250044-2212, 3 pages.

* cited by examiner

ACCESS CONTROL MECHANISM FOR SHAREABLE INTERFACE COMMUNICATION ACCESS CONTROL

This application is related to U.S. patent application Ser. No. 11/507,872, entitled "METHOD AND APPARATUS FOR PROTECTION DOMAIN BASED SECURITY", filed by THIERRY VIOLLEAU et al. on Aug. 21, 2006, the entire contents of which is hereby incorporated by reference for all purposes as if fully set forth herein.

This application is related to U.S. patent application Ser. No. 11/511,948, entitled "METHOD AND APPARATUS FOR DATA TRANSFER BETWEEN ISOLATED EXECUTION CONTEXTS", filed by THIERRY VIOLLEAU et al. on Aug. 28, 2006, the entire contents of which is hereby incorporated by reference for all purposes as if fully set forth herein.

BACKGROUND

There are many computing environments having multiple applications that need to interact with each other. There needs to be a mechanism to protect the applications and their protected resources, while still allowing interaction between the applications. One protection mechanism is to execute each bundle of applications in its own execution context. This technique is referred to as "context isolation."

Context isolation means that a first application, or application instance, cannot access protected resources owned by a second application, or application instance, in another execution context unless the second application explicitly provides an interface for access to the protected resources. As used herein, the terms "application" and "application instance" are sometimes used interchangeably, even though the term "application instance" may specifically refer to an instance of an application while the term "application" may generally refer to a computer program that can give rise to many instances of itself at runtime.

Isolation of execution contexts may be enforced by a security mechanism such as a firewall. To share a protected resource with a client application in another execution context, a server application can provide a shareable interface object (SIO) to the client application. The firewall allows the protected resource to be passed based on the fact that the SIO is being used to pass the protected resource. As used herein, the term "protected resources" refers to SIO objects, data, methods, classes, protected functionality, instances of classes, static methods of classes, or a combination thereof.

Smart cards are an example platform in which an application developer may wish to allow an application to interact with another application in a different isolated execution context. Smart cards are wallet-size or smaller devices with embedded integrated circuits. A smart card typically comprises a processor and memory. Smart cards come with various tamper-resistant properties and are capable of storing vital information and hosting sensitive applications in a secure manner. Additional security is provided by smart cards implementing the Java Card technology with the aforementioned firewall/context isolation scheme.

However, context isolation does not provide fine-grained protection such as application specific protection. That is, in the context isolation scheme alone, all server applications in an execution context would treat all client applications in another execution context in the same way. But, in reality, different server applications in a single execution context may have different security requirements. One such server application may not be as critical as another such server application, even though both are in the same execution context. Similarly, different client applications in a single execution context may carry different credentials. One such client application may by its nature require more privilege than another client application.

Under limited circumstances, security specific to an application may be programmatically provided by the application itself. For example, a server application may contain program logic to determine whether a client application is one the server application would allow or whether a specific protected resource requires additional layer of authentication and authorization when authenticating a client application. However, this programmatic approach of application specific security requires that the program logic be implemented by an application developer in the server application before deployment. Since the developer might not fully know about specific types of clients a server application would encounter in the real world at runtime, new versions of the server application must be frequently developed and upgraded to cope with new clients and new security requirements.

Therefore, it would be desirable to allow for fine-grain, application specific security in a flexible, complementary manner in a system that has already built in coarse-grain security based on context isolation.

SUMMARY

In accordance with one embodiment of the present invention, there is provided an access control mechanism on a computing device which allows an application provider to set up a declarative security policy specific to an application module. In one embodiment, the access control mechanism is implemented as a part of an access controller in the runtime environment. In addition, in some embodiments, the access control mechanism provides a user interface for the application provider to specify the policy or download the policy from other computing devices.

In one embodiment, the computing device has been installed with a plurality of application bundles, each of which comprises one or more application modules. Each application bundle has been signed with a private key assuming a public key infrastructure. The private key corresponds to a set of credentials: a public key and a public key certificate. This set of credentials (public key and public key certificate) is associated with a protection domain. Each protection domain on the computing device is described by a domain security policy on the computing device. In some embodiments, domain security policies for all protection domains, constituting a platform policy on the computing device, are stored in a common file.

In one embodiment, an application module comprises Java classes. One such class may contain an initial entry point that can be invoked at runtime to create a corresponding application instance. In some embodiments, a runtime environment such as Java Card Runtime Environment on a smart card would assign all application instances from one application bundle a unique execution context identifier.

Suppose that the runtime environment of the computing device is executing a first application instance from a first application bundle in a first execution context. In one embodiment, the first execution context is isolated by a firewall from other execution contexts. Since an execution context such as the first execution context is associated with an application bundle such as the first application bundle, which in turn is associated with a protection domain, say a first protection domain, the first execution context that is associated with the first application bundle is deemed as (indirectly) associated with the first protection domain that is associated with the first application bundle.

In one embodiment, the first application instance corresponds to an application module, say a first application module, that contains a first set of instructions, execution of which gives rise to the first application instance. For the purpose of illustration, suppose that the runtime environment of the computing device now receives a request from a second application instance to access a protected resource in an SIO in the first application instance. In response to the request, the runtime environment determines whether there is a context switching (i.e., the second application instance and the first application instance are in different context), and if so, invokes the firewall, which in turn invokes the access control mechanism, to determine whether application instances in the second protection domain are allowed to access the SIO in the first application instance.

In one embodiment, the access control mechanism performs two distinct determination steps. The first determination step occurs at a coarse-grain level and checks an appropriate protection domain policy to determine whether this requested access should be permitted. In one embodiment, this task is delegated by the firewall to another entity in the runtime environment such as an access control mechanism. In any event, the first determination step is made by identifying a second protection domain that is associated with the second execution context, looking up the domain security policy associated with the second protection domain, and locating a first set of access control attributes in one or more entries in the domain security policy relating to the first protection domain, which first set of access control attributes determines access by the second protection domain to protected resources in the first protection domain.

If it is determined that the applications in the second protection domain are allowed to access protected resources in the first protection domain at the coarse-grain level (i.e., the domain security policy level), then the second determination step is invoked at a fine-grain level and checks an appropriate declarative security policy to determine whether the requested access should be permitted. The second determination step is made by identifying a second application module that contains a second set of instructions, execution of which gives rise to the second application instance, looking up the declarative security policy associated with the first application module, and locating a second set of access control attributes in one or more entries in the declarative security policy associated with the first application module, which second set of access control attributes determines access by the second application instance to protected resources in the first application instance.

If it is determined that the applications in the second protection domain are not allowed to access protected resources in the first protection domain or that the second application module is not allowed to access the SIO in the first application module, then the second application instance is denied access to the protected resource requested. On the other hand, if both determination steps yield positive answers, the runtime environment allows the second application instance to access the protected resource.

These and other aspects of the present invention will be discussed in greater detail in the following sections.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

System Overview

Figure 1:
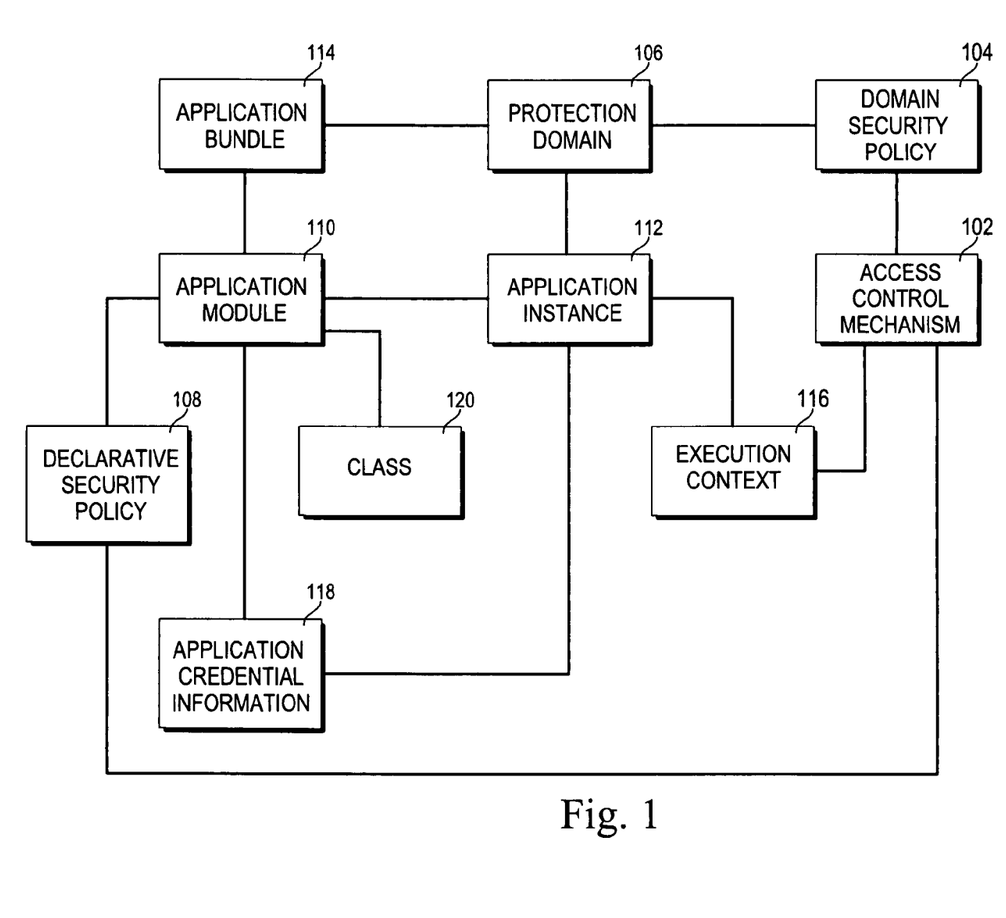
FIG. 1 is a diagram illustrating elements involved in implementing application specific declarative security, according to an embodiment of the present invention.

FIG. 1 is an illustration of elements involved in implementing application specific declarative security, according to an embodiment of the present invention. In one embodiment, an access control mechanism 102 is provided in a runtime environment 100 on a computing device. The access control mechanism 102, by itself or through delegation to other functionality of the runtime system, allows an application provider to set up domain security policies 104, each of which is associated with a protection domain 106. Additionally or alternatively, the access control mechanism 102 allows the application provider to set up declarative security policies 108, each of which is specific to an application module 110. As used herein, the term "declarative security policy" refers to a policy that expresses security constraints—including roles, access control, and authentication requirements—specific to an application in a form external to the application. Being external to the application, the declarative security policy may be further modified after the application is deployed. In one embodiment, each application is installed or downloaded along with metadata which contains information about constraints under which its resources can be accessed from other applications. In one embodiment, a declarative security policy 108 for an application module 110 comprises application-level permission targets, each of which is associated with a protected resource—e.g., an SIO, or data, methods, objects or functionality contained in or exposed by an SIO. The declarative security policy 108 further comprises lists of application modules 110. Each list is associated with a permission target and application modules 110 specified on the list are those permitted to access the permission target. In one embodiment, a declarative security policy 108 for an application module 110 is packaged within the application module 110 as a file such as an application descriptor.

In one embodiment, the access control mechanism 102 is implemented as a part of the runtime environment 100, for instance, inside an access controller. In one embodiment, the access control mechanism 102 is implemented within an application container that is associated with a plurality of application instances 112. The term "application container" refers to a software module in the runtime environment 100 that handles common tasks for one or more application instances 112. These common tasks comprise, for example, tasks related to lifecycle management (starting and terminating application instances) and security management (implementing security constraints at application level or domain level), etc.

In one embodiment, the computing device has been installed with a plurality of application bundles 114, each of which comprises one or more application modules 110. Each application bundle 114 may be signed with a private key assuming a public key infrastructure (PKI). The private key corresponds to a set of credentials: a public key and a public key certificate. This set of user credential information (public key and public key certificate) is associated with a particular application bundle 114 and in turn a protection domain 106. Each protection domain 106 in the runtime environment 100 on the computing device is described by a domain security policy 104 on the computing device. In one embodiment, a domain security policy 104 for a protection domain 106 comprises a list of protection domains 106. The protection domains 106 on the list are permitted to access protected resources in the protection domain 106 that is associated with the domain security policy 104. In one embodiment, domain security policies 104 for all protection domains 106 on the computing device are stored in a common file.

In one embodiment, those application bundles 114 that have not been signed with any private key are associated by default with a default set of user credential information. In one embodiment, a default domain security policy 104 is associated with the default set of user credential information.

In one embodiment, an application module 110 comprises one or more classes 120, a declarative security policy 108, and a set of application credential information 118. In one embodiment, source files for the classes 120 are written in Java. For the purpose of illustration, one class 120 in an application module 110 may contain an initial entry point that can be invoked at runtime to create a corresponding application instance 112. Examples of such initial entry functions are "main" function for general applications, "service" function for servlets, or "install" function for Java Card applets. At runtime, execution of a sequence of code associated with the initial entry function in the class 120 causes loading, linking, initializing and executing of additional code and/or classes, thereby giving rise to an application instance 112.

In some embodiments, the runtime environment 100, such as Java Card Runtime Environment on a smart card, assigns all application instances 112 from one application bundle 114 a unique identifier that identifies an execution context 116. In some embodiments, the runtime environment 100 also places a set of identification information in an application instance 112 that associates the application instance 112 with its respective application module 110 and application bundle 114. The set of identification information can be placed, for example, when the application instance 112 is created. The access control mechanism 102 can thereafter extract the set of identification information and use it to determine identities of an application module 110 and an application bundle 114 that are associated with the application instance 112.

The runtime environment can detect a request by a client application instance 112 to a server application instance 112 as being one that crosses execution context boundary by comparing unique numbers that are respectively carried by the client and server application instances 112 identifying different execution contexts 116 in which each executes. For example, when the client application instance 112 makes a request for a protected resource in a SIO of the server application instance 112, a firewall 210 in the runtime environment 100 can detect the request as being one that crosses different execution contexts 116 because a first unique number the server application instance 112 carries identifies a first execution context 116 and a second unique number the client application instance 112 carries identifies a second execution context 116 that is different from the first execution context 116.

The access control mechanism 102, by itself or through its delegate, maintains a map that maps a plurality of execution contexts 116 to a plurality of protection domains 106. This map can be used by the access control mechanism or its delegate to determine a protection domain that is associated with an execution context. For example, based on the map, the access control mechanism 102 can determine a first protection domain 106 that is associated with the first execution context 116, a second protection domain 106 that is associated with the second execution context 116, and a domain security policy 104 that is associated with the second protection domain 106.

Based on the domain security policy 104 associated with the second protection domain 106, the access control mechanism 102 can determine, by a simple lookup, whether the first protection domain is on a list of protection domains that allows the second protection domain 106 to access protected resources in the first protection domain 106.

As noted earlier, in one embodiment, the runtime environment 100 places a set of identification information in an application instance 112 at the time of creation of that instance. Thus, from a set of identification information carried by the server application instance 112, the access control mechanism 102 can determine a server application module 110 that gives rise to the server application instance 112. Likewise, from a set of identification information carried by the client application instance 112, the access control mechanism 102 can determine a client application module 110 that gives rise to the client application instance 112.

Once the server application module 110 is identified, the access control mechanism can further locate a declarative security policy 108 that is associated with the server application module 110. Based on this declarative security policy 108, the access control mechanism 102 can determine whether the client application module 110 is on a list of application modules that are authorized to access the protected resource in the SIO.

In one embodiment, once it is determined that both the domain security policy associated with the client protection domain and declarative security policy for the server application module permit access by the client application instance 112, the access control mechanism allows the client application instance access 112 to the requested protected resource.

However, in the embodiments where the client application instance 112 carries the set of application credential information 118 in its request, as noted earlier, this set of application credential information 118 can be extracted from the request and used to satisfy additional authentication and/or authorization requirement for accessing a specific target protected resource before access to the protected resource is granted. In one embodiment, the additional authentication and/or authorization may be performed by the access control mechanism. In another embodiment, the additional authentication and/or authorization may be performed by the server application instance 112 using its own program logic.

In one embodiment, a domain security policy 104 associated with a protection domain 106 is external to application bundles 114 installed on the portable computing device. In one embodiment, a declarative security policy 108 for an application module 110 is external to one or more classes 120 contained within the application module 110. Thus, the domain security policy 104 and the declarative security policy 108 can be modified by an application provider after application bundles 114 (which include the aforementioned application module 110) have already been deployed. Specifically, the declarative security policy 108 and the domain security policy 104 can be modified without a need to rebuild the one or more classes 120 contained within the application module 110. In one embodiment, the access control mechanism 102 provides a user interface for the application provider to specify or download the domain security policies 104 and/or the declarative security policies 108 from other computing devices to the computing device.

Sample Operation of System

Figure 2:
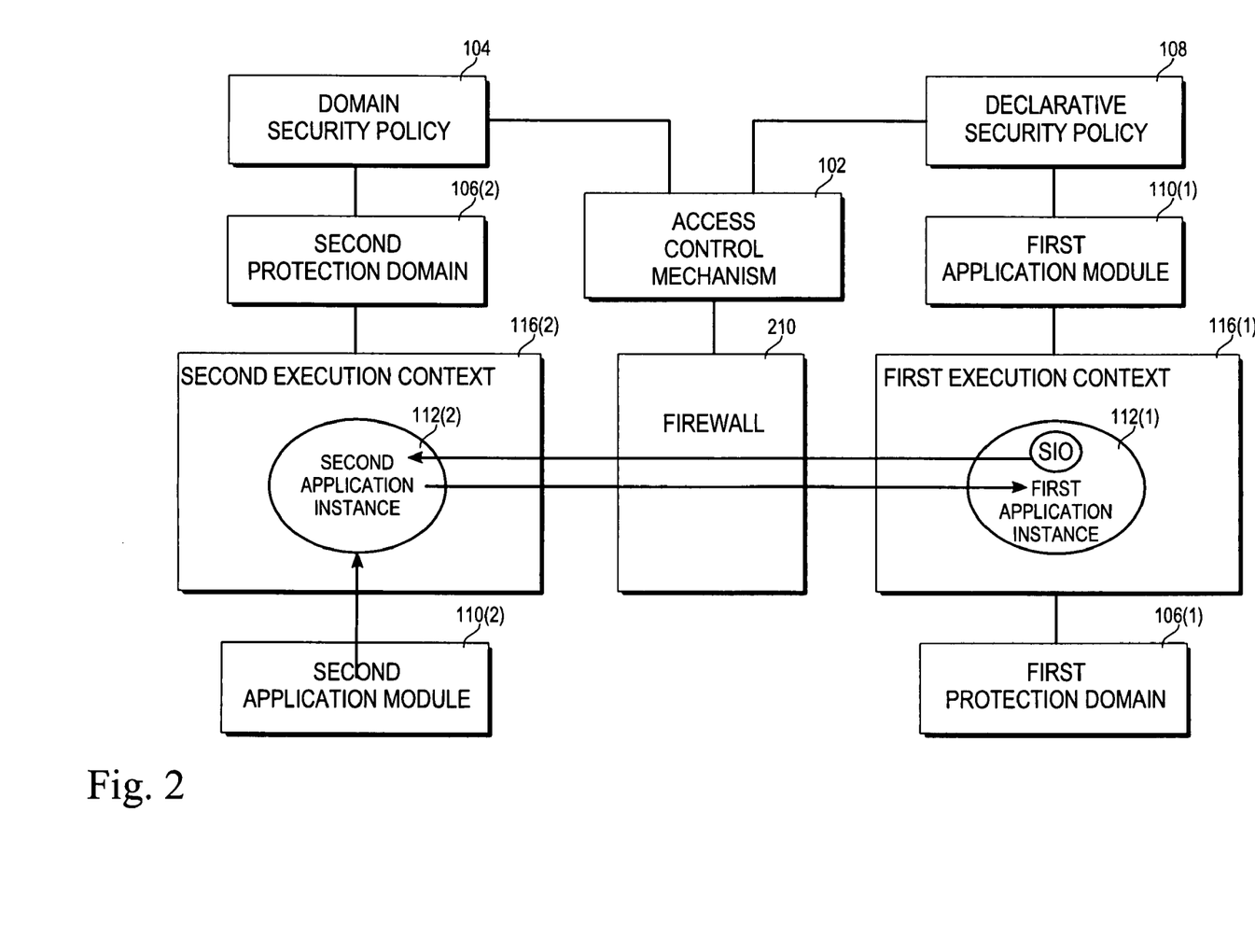
FIG. 2 is a diagram illustrating elements involved in implementing application specific declarative security, in accordance with another embodiment of the present invention.
Figure 3:
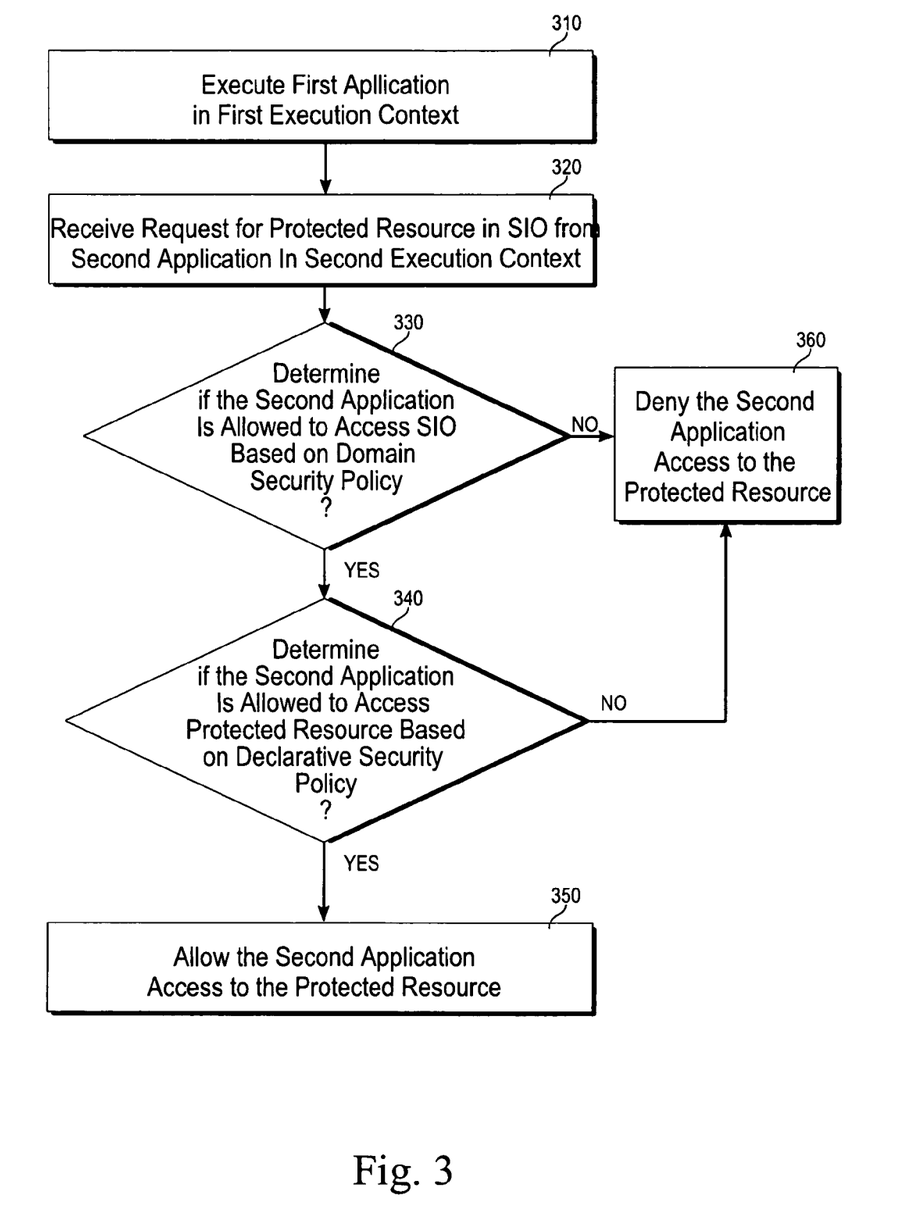
FIG. 3 is a flow diagram which provides a high level overview of operation involving a access control mechanism.

A flow diagram which provides a high level overview of operation involving the access control mechanism in accordance with one embodiment of the present invention is shown in FIG. 3. Additional references to the system diagrams of FIGS. 1 and 2 will be made in the discussion herein.

As shown in FIG. 2, the runtime environment 100 of the computing device is executing a first application instance 112(1) in a first execution context 116(1) (step 310 of FIG. 3). The first execution context 116(1) is isolated by the firewall 210 from other execution contexts 112. For the purpose of illustration, the first execution context 116(1) is associated with a first protection domain 106(1). Furthermore, the first application instance 112(1) corresponds to a first application module 110(1). That is, execution of a first set of instructions contained in a first class 120 of FIG. 1 contained within the first application module 110(1) gives rise to the first application instance. As noted before, the first class 120 comprises an initial entry point such as a "main" function (or an "install" function on a smartcard platform) that can be invoked at runtime to create an application instance 112 such as the first application instance 112(1). Once the initial entry point is invoked, sequences of code from additional classes in the first application module 110(1) or other application modules 110 or extension and system libraries or the runtime environment, etc., may be directly and indirectly referenced by the first class 120 and subsequently executed as a part of a process executing the first application instance 112(1).

When a second application instance 112(2) in a different execution context, e.g., a second execution context 116(2), wishes to communicate with the first application instance 116(1), the second application instance 112(2) can send a request for a target protected resource in a SIO exposed by the first application instance 112(1). The request is received by the runtime environment 100 (step 320 of FIG. 3).

As shown in FIG. 2, the second execution context 116(2) can be identified as associated with a second protection domain 106(2) through an application bundle 114 of FIG. 1. Likewise, through extracting a set of identification information carried by the second application instance 112 (2), the second application instance 112(2) can be identified as corresponding to a second application module 110(2). That is, execution of a second set of instructions contained in a second class 120 of FIG. 1 contained within the second application module 110(1) gives rise to the second application instance. As noted before, the second class 120 comprises an initial entry point such as a "main" function (or an "install" function on a smartcard platform) that can be invoked at runtime to create an application instance 112 such as the second application instance 112(1). Once the initial entry point is invoked, sequences of code from additional classes in the second application module 110(1) or other application modules 110 or extension and system libraries or the runtime environment, etc., may be directly and indirectly referenced by the second class 120 and subsequently executed as a part of a process executing the second application instance 112(2).

In response to the request, the runtime environment 100 invokes the access control mechanism 102 to determine whether application instances in the second protection domain 106(2) are allowed to access the SIO requested in the first execution context 116(1) (step 330 of FIG. 3). This determination is made by the access control mechanism 102 by looking up and a domain security policy 104, which is, as shown in FIG. 2, associated with the second protection domain 106(2), locating entries in the policy that defines a set of access control attributes (such as permissions and denials) for the second protection domain 106(2) to access protected resources in another protection domain. For example, the domain security policy 104 associated with the second protection domain 106(1) may specify that application instances in the second protection domain are allowed to access the SIO in the first protection domain 106(1).

If the access control mechanism 102 determines that the application instances 112 in the second protection domain 106(2) are not allowed to access protected resources owned by the applications in the first protection domain, then the second application instance 112(2) is denied access to the protected resource requested (step 360 of FIG. 3). Otherwise, in response to a determination that the application instances 112 in the second protection domain 106(2) are allowed to access protected resources in the first protection domain 106 (1), the access control mechanism 102 proceeds to determine whether the second application module 110(2) belongs to a set of application modules 110 that are allowed to access the protected resource (step 340 of FIG. 3). This determination is made by the access control mechanism by looking up a declarative security policy 108, which is, as shown in FIG. 2, associated with the first application module 110(1), and next locating entries in the policy that define a set of access control attributes (such as permissions and denials) for the second application module 110(2). For example, the declarative security policy 108 for the first application module 110(1) may specify that application instances 112 created from a set of application modules 110 are allowed to access the protected resource.

The second application instance 112(2) is denied access to the protected resource requested, if the runtime environment 100 through the access control mechanism 102 determines that the second application module 110(2) is not in the set of application modules 110 that are allowed to access the protected resource (step 360 of FIG. 3). On the other hand, in response to a determination that the second application module 110(2) belongs to a set of application modules 110 that are allowed to access the protected resource, the runtime environment 100 allows the second application instance 112(2) to access the protected resource (step 350 of FIG. 3).

In the foregoing discussion, examples of permission targets in the declarative security policy 108 have been made only to shareable interface objects (e.g., the SIO containing the protected resource requested by the second application instance 112(2)). This invention is not so limited. In some embodiments, some of the permission targets in the declarative security policy 108 may be specified as an SIO pattern that may match one or more identifiers for one or more SIOs in the first protection domain 106(1). Thus, in determining whether the second protection domain 106(2) can access the protected resource in the SIO, the access control mechanism 102 tries to match an identifier for the requested SIO, which can be extracted from the request, with a permission target given as either an SIO identifier or an SIO pattern.

In some embodiments, some of the permission target in the declarative security policy 108 may be coarser- or finer-grained protected resources than SIOs. For example, a permission target in the domain security policy 104 may be specified as a datum, or a method, or an object contained within an SIO or functionality across multiple SIOs, rather than an SIO or a single resource there within. Thus, in determining whether application instances in the second protection domain 106(2) may access the protected resource, the access control mechanism 102 extracts a set of identification information for the protected resource requested, and uses the set of identification information to match permission targets in the declarative security policy 108 that are specified as coarser- or finer-grained resources. These and other variations of specifying permission targets are all within the scope of the present invention.

In the foregoing discussion, examples of access control targets in the domain security policy 104 and declarative security policy 108 have been made only to permission targets. This invention is not so limited. In some embodiments, denial targets may be specified in the domain security policy 104 or the declarative security policy 108. For example, the domain security policy 104 may specify an SIO as a denial target along with a protection domain 106 that is to be denied access to the protection domain associated with the domain security policy 104. In determining whether a particular protection domain 106 is permitted to access the SIO, the access control mechanism 102 extracts an SIO identifier from the request and determines whether the SIO identifier extracted matches the denial target. In response to a determination that the SIO identifier matches the denial target, the access control mechanism 102 checks to see if the particular protection domain 106 is a protection domain that is to be denied access to the protection domain associated with the domain security policy 104. If it is determined that the particular protection domain 106 does not have access with respect to the denial target, the access control mechanism 102 denies any application instances 112 in the particular protection domain 106 from accessing the SIO.

Likewise, denial targets can be specified in the declarative security policy 108. For example, the declarative security policy 108 may specify a protected resource as a denial target and a list of application modules 110 that are to be denied access to the protected resource. In determining whether a particular application module 110 is permitted to access the protected resource, the access control mechanism 102 extracts a protection resource identifier from the request and determines whether the protection resource identifier extracted matches the denial target. In response to a determination that the protection resource identifier matches the denial target, the access control mechanism 102 checks to see if the particular application module 110 is on the list of application modules that are to be denied access to the protected resource. If it is determined that the particular application module 110 is on the list, the access control mechanism 102 denies any application instances 112 associated with the particular application module 110 from accessing the protected resource.

In the foregoing discussion, declarative security policy permissions/security constraints are only expressed in terms of application module sets to which the permission may be granted/denied. This invention is not so limited. The permissions/security constraints may also be expressed in terms of application instance identifier sets and application instance protection domain sets. For example, an application instance identifier set may comprise attributes specific to an application instance that is even finer-grain than a granularity level represented by an application module to which a declarative security policy is associated. Likewise, a protection domain set may comprise attributes that are coarser-grain than a granularity level represented by an application module to which a declarative security policy is associated. These and other variations of specifying permission/security constraints are within the scope of the present invention.

In the foregoing discussion, domain security policy permissions are only expressed in terms of protection domains to which the permission may be granted/denied. This invention is not so limited. The domain security policy permissions may also be expressed in terms of application instance ID set and application module sets. Thus, a permission in a domain security policy may be specified by finer-grain attributes of application instance and application module than a granularity level to which a protection domain is associated. These and other variations of specifying domain security policy permissions are within the scope of the present invention.

Hardware Overview

Figure 4:
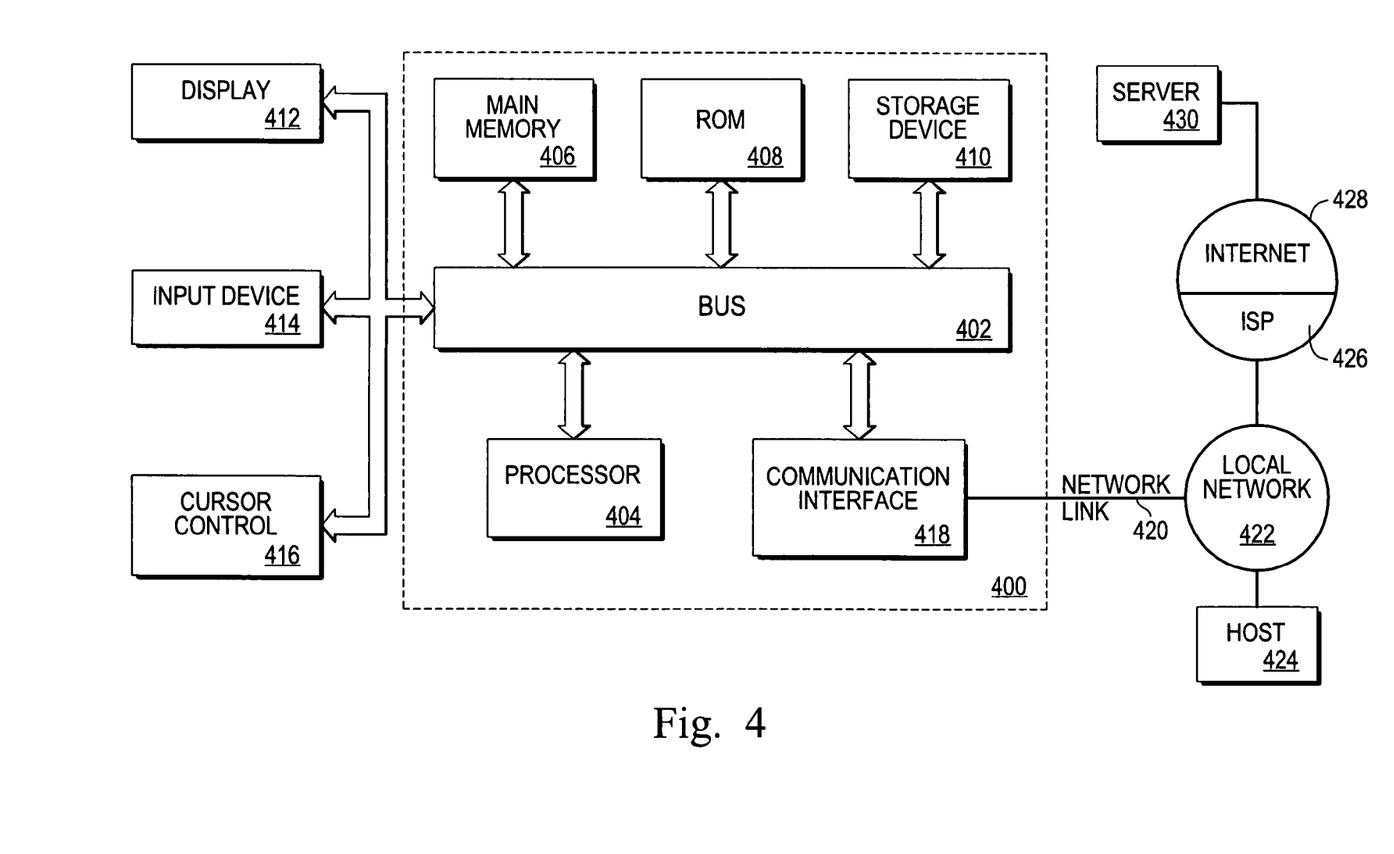
FIG. 4 is a block diagram of a general purpose computer system in which one embodiment of the present invention may be implemented.

In one embodiment, the access control mechanism takes the form of a set of instructions that are executed by one or more processors. FIG. 4 is a block diagram of a computer system 400 upon which an embodiment of the access control mechanism may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, and any other memory chip or cartridge.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine readable non-transitory medium, comprising instructions for causing one or more processors to:

execute a first application from a first bundle of applications to obtain a first application instance in a first execution context, wherein the first application instance comprises a first protected resource in a shareable interface object (SIO), wherein the first execution context is isolated by a firewall from a second execution context, wherein the first execution context is associated with a first protection domain, and wherein the first protection domain specifies the first bundle of applications a first set of instructions, when executed giving rise to the first application instance, is packaged within a first application module;

receive a request from a second application instance executing in the second execution context-to access the first protected resource, wherein the second application instance is obtained by executing a second application from a second bundle of applications, wherein the second execution context is associated with a second protection domain, wherein the second protection domain specifies a second bundle of applications subject to a first domain security policy, wherein the first domain security policy comprises a first list of protection domains, and wherein the first domain security policy permits an application from the second bundle of applications to access a protected resource of another protection domain when the another protection domain is specified in the first list of protection domains in a shareable interface object (SIO) in the first application instance, make a first determination, based on the request and first domain security policy, that the first protection domain is specified in the first list of protection domains based on the first determination:

make a second determination, based on the second application and a declarative security policy associated with the first application that the second application is authorized to access the protected resource; and based on the first determination and the second determination: grant the second application access to the first protected resource.

2. The machine readable non-transitory medium of claim 1, wherein the declarative security policy may be modified without modifying classes in the first application module.

3. The machine readable non-transitory medium of claim 1, wherein the first domain security policy may be modified without modifying classes in the first application module.

4. The machine readable non-transitory medium of claim 1, wherein the first domain security policy comprises permission targets as SIO identification patterns; and wherein the instructions for causing one or more processors to make the first determination determine whether application instances in the second protection domain are allowed to access the SIO in the first execution context further comprise instructions for causing one or more processors to: instructions for causing one or more processors to extract an SIO identifier from the request; and compare the SIO identifier extracted with the permission targets for a match.

5. The machine readable non-transitory medium of claim 1, wherein the declarative security policy comprises a denial target and a list of applications that are not allowed to access the denial target;
   and wherein the instructions for causing one or more processors to make the second determination determine whether the second application module belongs to a set of application modules that are allowed to access the protected resource further comprise instructions for causing one or more processors to: instructions for causing one or more processors to extract a protection resource identifier from the request; when the protection resource identifier matches the denial target, determine whether the second application is in the list of applications that are not allowed to access the denial target; and when the second application is in the list of applications modules deny the second application instance access to the first protected resource.

6. The machine readable non-transitory medium of claim 1, further comprising instructions for causing one or more processors to: extract a set of application credential information from the request;
   and perform additional authentication and authorization based on the set of application credential information extracted.

7. An apparatus, comprising:
one or more processors; and a machine readable non-transitory medium comprising instructions for causing the one or more processors to:
execute a first application from a first bundle of applications to obtain a first application instance in a first execution context, wherein the first application instance comprises a first protected resource in a shareable interface object (SIO), wherein the first execution context is isolated by a firewall from a second execution context, wherein the first execution context is associated with a first protection domain, and wherein the first protection domain specifies the first bundle of applications a first set of instructions, when executed giving rise to the first application instance, is packaged with a first application module;
receive a request from a second application instance executing in the second execution context to access the first protected resource, wherein the second application instance is obtained by executing a second application from a second bundle of applications, wherein the second execution context is associated with a second protection domain, wherein the second protection domain specifies a second bundle of applications subject to a first domain security policy, wherein the first domain security policy comprises a first list of protection domains, and wherein the first domain security policy permits an application from the second bundle of applications to access a protected resource of another protection domain when the another protection domain is specified in the first list of protection domains in a shareable interface object (SIO) in the first application instance, wherein a second set of instructions, when executed giving rise to the second application instance, is packaged with a second application module;
make a first determination, based on the request and first domain security policy, that the first protection domain is specified by the first list of protection domains based on the first determination:
make a second determination, based on the second application and a declarative security policy associated with the first application that the second application is authorized to access the first protected resource; and based on the first determination and the second determination: grant the second application access to the first protected resource.

* * * * *

UNITED STATES PATENT AND TRADEMARK OFFICE
CERTIFICATE OF CORRECTION

| | | |
|---|---|---|
| PATENT NO. | : 7,926,086 B1 | Page 1 of 1 |
| APPLICATION NO. | : 11/591084 | |
| DATED | : April 12, 2011 | |
| INVENTOR(S) | : Thierry P. Violleau et al. | |

It is certified that error appears in the above-identified patent and that said Letters Patent is hereby corrected as shown below:

In Claim 1, Column 12, lines 42-45, please delete "a first set of instructions, when executed giving rise to the first application instance, is packaged within a first application module."

In Claim 1, Column 12, lines 60-61, please delete "in a shareable interface object (SIO) in the first application instance."

In Claim 4, Column 13, lines 16-18, please delete "determine whether application instances in the second protection domain are allowed to access the SIO in the first execution context."

In Claim 4, Column 13, lines 19-20, please delete "instructions for causing one or more processors to."

In Claim 5, Column 13, lines 28-31, please delete "determine whether the second application module belongs to a set of application modules that are allowed to access the protected resource."

In Claim 5, Column 13, lines 32-33, please delete "instructions for causing one or more processors to."

In Claim 7, Column 14, lines 13-16, please delete "a first set of instructions, when executed giving rise to the first application instance, is packaged with a first application module."

In Claim 7, Column 14, lines 31-35, please delete "in a shareable interface object (SIO) in the first application instance, wherein a second set of instructions, when executed giving rise to the second application instance, is packaged with a second application module."

Signed and Sealed this
Sixteenth Day of August, 2011

David J. Kappos
*Director of the United States Patent and Trademark Office*